(12) United States Patent
Xin et al.

(10) Patent No.: US 10,299,252 B2
(45) Date of Patent: May 21, 2019

(54) CONTROL INFORMATION, CHANNEL OR SIGNAL TRANSMISSION METHOD AND CORRESPONDING SENDING END

(71) Applicant: ZTE CORPORATION, Shenzhen, Guangdong Province (CN)

(72) Inventors: Yu Xin, Shenzhen (CN); Liujun Hu, Shenzhen (CN); Guanghui Yu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 28 days.

(21) Appl. No.: 15/529,516

(22) PCT Filed: Mar. 24, 2015

(86) PCT No.: PCT/CN2015/074955
§ 371 (c)(1),
(2) Date: May 25, 2017

(87) PCT Pub. No.: WO2015/184906
PCT Pub. Date: Dec. 10, 2015

(65) Prior Publication Data
US 2017/0325208 A1 Nov. 9, 2017

(30) Foreign Application Priority Data
Nov. 28, 2014 (CN) .......................... 2014 1 0712277

(51) Int. Cl.
*H04L 1/00* (2006.01)
*H04W 72/04* (2009.01)

(52) U.S. Cl.
CPC ........... *H04W 72/0406* (2013.01); *H04L 1/00* (2013.01); *H04L 1/001* (2013.01); *H04L 1/0004* (2013.01)

(58) Field of Classification Search
CPC .. H04W 72/0406; H04L 1/001; H04L 1/0004; H04L 1/00
See application file for complete search history.

(56) References Cited

U.S. PATENT DOCUMENTS

2003/0076870 A1* 4/2003 Moon ................. H04J 13/0048
375/130
2011/0269492 A1* 11/2011 Wang ..................... H04L 5/003
455/509

(Continued)

FOREIGN PATENT DOCUMENTS

| CN | 1879325 A | 12/2006 |
| CN | 101299653 A | 11/2008 |
| CN | 103026677 A | 4/2013 |

*Primary Examiner* — Mohammad S Anwar
(74) *Attorney, Agent, or Firm* — Ling Wu; Stephen Yang; Ling and Yang Intellectual Property

(57) ABSTRACT

A method for transmitting control information, a channel or signal, and a corresponding sending end are provided. The method includes: after performing low bit rate coding and/or low order modulation on data containing the control information, carrying the data on partial physical resources of a reference signal for transmission, herein the coding rate is lower than the highest coding rate set by the system and the modulation order is lower than the highest modulation order set by the system. The method further includes: selecting one transmission mode from multiple transmission modes configured for the channel or signal; transmitting known data; transmitting non-known data and being subject to a coding limitation and/or modulation limitation; and transmitting the non-known data and not being subject to the modulation limitation and the coding limitation; and sending transmission mode configuration information to a receiving end to indicate the selected transmission mode.

23 Claims, 6 Drawing Sheets

(56) References Cited

U.S. PATENT DOCUMENTS

2013/0258936 A1\* 10/2013 Choi ................. H04W 72/0453
  370/312
2014/0086192 A1\* 3/2014 Kim ................... H04W 72/042
  370/329

\* cited by examiner

CONTROL INFORMATION, CHANNEL OR SIGNAL TRANSMISSION METHOD AND CORRESPONDING SENDING END

TECHNICAL FIELD

The document relates to the field of communications, and more particularly, to a method for transmitting control information, channel or signal, and a corresponding sending end.

BACKGROUND

Long Term Evolution (LTE) technology is a Fourth Generation (4G) wireless cellular communication technology. The LTE uses an Orthogonal Frequency Division Multiplexing (OFDM) technology, and time-frequency resources formed by subcarriers and OFDM symbols constitute wireless physical resources of an LTE system. Data of the LTE are carried on the wireless physical resources for transmission. The more the data information transmitted on the same amount of physical resources, the higher the transmission efficiency of the system.

In LTE uplink and downlink transmission, reference signal needs to be transmitted. The reference signal or pilot channel transmits data, known to a receiving end, for channel estimation at the receiving end. The known data are not data that needs to be demodulated at the receiving end, but the known data occupy physical resources, thus reducing the physical resource utilization of the system and further reducing the spectral efficiency of the system. How to reduce the physical resources occupied by the reference signal is an issue worthy of being studied and solved.

Moreover, for some wireless environments, the density of the reference signal can be reduced. If the system uses reference signal with high density, then in these wireless channel environments, the physical resources will be wasted, thereby reducing the system spectral efficiency. However, for some wireless environments, reference signal with higher density is required. If the system uses reference signal with low density, then a precision requirement of channel estimation cannot be met. How to avoid waste of the physical resources and meet the precision requirement of the channel estimation is also an issue worthy of being studied and solved.

In addition, with the development of communications and the higher demand on system performance, control information that needs to be sent by a sending end will become more and more. For example, Network-Assisted Interference Cancellation and Suppression (NAICS), which is a topic currently discussed in the 3rd Generation Partner Project (3GPP) conference, requires a network side to send a lot of interference control information to a terminal to improve demodulation performance of the terminal. However, too much control information sent by the system will occupy a lot of physical resources. How to make full use of physical resources to send more control information is also an issue worthy of being studied and solved.

Now major companies begin to study the wireless communication Fifth Generation (5G) technology to expect to better improve the time-frequency resource utilization, thereby improving system efficiency. Therefore, it is of great significance to study and propose better ways to solve multiple technical issues described above.

SUMMARY

An embodiment of the present disclosure provides a method for transmitting control information (also called a first method for transmitting control information), applied to a sending end and including:

performing low bit rate coding and/or low order modulation on data containing the control information, herein the low bit rate coding satisfies a limitation that: a coding rate is lower than a highest coding rate set by a system, and the low order modulation satisfies a limitation that: a modulation order is lower than a highest modulation order set by the system; and carrying the data containing the control information, on which the low bit rate coding and/or the low order modulation have/has been performed, on partial physical resources of a reference signal to send to a receiving end.

In an exemplary embodiment, the low bit rate coding also satisfies a limitation that: the coding rate is equal to or lower than a coding rate of user data carried on nearby physical resources and sent to a same receiving end, herein the nearby physical resources include physical resources near each physical resource of the partial physical resources.

In an exemplary embodiment, the low order modulation also satisfies a limitation that: for each physical resource of the partial physical resources, a modulation order of the data containing the control information carried on the physical resource is equal to or lower than a modulation order of the user data carried on nearby physical resources of the physical resource and sent to a same receiving end.

In an exemplary embodiment, the physical resources use a resource element as a unit; each physical resource of the partial physical resources refers to each resource element in the partial physical resources, and the physical resources near the each physical resource refer to other resource elements in a physical resource block where the resource element is located.

In an exemplary embodiment, the partial physical resources of the reference signal are distributed on the physical resources of the reference signal in a distributed manner or in an interval-distribution manner.

In an exemplary embodiment, performing low code rate coding on data containing the control information includes: performing the low bit rate coding on control information data, and performing low order modulation on data containing the control information includes performing the low-order modulation on the control information data; or performing the low-order modulation on data obtained after combining the control information data and reference signal data.

In an exemplary embodiment, the control information data includes at least data about interference data related information.

Accordingly, an embodiment of the present disclosure further provides a sending end including a transmission module, and the transmission module includes a data processing unit and a data sending unit.

The data processing unit is configured to perform low bit rate coding and/or low order modulation on data containing control information, herein the low bit rate coding satisfies a limitation that: a coding rate is lower than a highest coding rate set by a system, and the low order modulation satisfies a limitation that: a modulation order is lower than a highest modulation order set by the system.

The data sending unit is configured to carry the data containing the control information, on which the low bit rate coding and/or the low order modulation have/has been performed, on partial physical resources of a reference signal to send to a receiving end.

In an exemplary embodiment, when the data processing unit performs the low bit rate coding on the data containing the control information, a limitation is further satisfied that: the coding rate is equal to or lower than a coding rate of user data carried on nearby physical resources and sent to the same receiving end, herein the nearby physical resources include physical resources near each physical resource of the partial physical resources; and when the data processing unit performs the low order modulation on the data containing the control information, a limitation is further satisfied that: for each physical resource of the partial physical resources, a modulation order of the data containing the control information carried on the physical resource is equal to or lower than a modulation order of the user data carried on nearby physical resources of the physical resource and sent to a same receiving end, herein the physical resources use a resource element as a unit; each physical resource of the partial physical resources refers to each resource element in the partial physical resources, and the physical resources near the each physical resource refer to other resource elements in a physical resource block where the resource element is located.

In an exemplary embodiment, the data sending unit carries the data containing the control information, on which the low bit rate coding and/or the low order modulation have/has been performed, on the partial physical resources of the reference signal to send to the receiving end, herein the partial physical resources of the reference signal are distributed on physical resources of the reference signal in a distributed manner or in an interval-distribution manner.

In an exemplary embodiment, the data processing unit performing the low code rate coding on the data containing the control information includes: performing the low bit rate coding on control information data, and the data processing unit performing the low order modulation on the data containing the control information includes: performing the low-order modulation on the control information data, or performing the low-order modulation on data obtained after combining the control information data and reference signal data.

In the above scheme, the control information is carried on the partial physical resources of the reference signal, and the coding and modulation of the control information are limited, thereby improving the utilization of time-frequency resources without increasing the number of resources occupied by the reference signal.

An embodiment of the present disclosure provides another method for transmitting control information, applied to a sending end and including:

selecting one transmission mode from multiple transmission modes configured for control information, herein one of the multiple transmission modes is to transmit on partial physical resources of a reference signal; and sending transmission mode configuration information for the control information to a receiving end to indicate the selected transmission mode.

In an exemplary embodiment, sending transmission mode configuration information for the control information to a receiving end includes: sending the transmission mode configuration information for the control information to the receiving end through a common channel.

In an exemplary embodiment, if the selected transmission mode is to transmit on the partial physical resources of the reference signal; and the transmission method further includes: transmitting data of the control information in accordance with the above first method for transmitting control information.

Correspondingly, an embodiment of the present disclosure further provides a sending end including a transmission mode selection module and a transmission module for control information.

The transmission mode selection module is configured to select one transmission mode from multiple transmission modes configured for control information, herein one of the multiple transmission modes is to transmit on partial physical resources of a reference signal; and the transmission module is configured to send transmission mode configuration information for the control information to a receiving end to indicate the selected transmission mode.

In an exemplary embodiment, the transmission module sending the transmission mode configuration information for the control information to the receiving end includes: sending the transmission mode configuration information for the control information to the receiving end through a common channel.

In an exemplary embodiment, the transmission module includes the data processing unit and the data sending unit described above, and activates the data processing unit and the data sending unit to transmit control information data when the selected transmission mode is to transmit on the partial physical resources of the reference signal.

The above scheme provides multiple optional transmission modes for the control information, making it possible to select an appropriate transmission mode according to requirements of different scenes. For example, in a scene where a signal-to-noise ratio is high or coherence bandwidth or coherent time of a wireless channel is relatively large, it may be selected that the control information is carried on the partial physical resources of the reference signal, thereby improving the utilization of time-frequency resources.

An embodiment of the present disclosure further provides a method for transmitting a channel or signal, applied to a sending end and including:

selecting one transmission mode from multiple transmission modes configured for a channel or signal, herein the multiple transmission modes include two or three of the following transmission modes: transmitting known data; transmitting non-known data and being subject to a coding limitation and/or a modulation limitation; and transmitting non-known data and not being subject to the coding limitation and the modulation limitation; and sending transmission mode configuration information for the channel or signal to a receiving end to indicate the selected transmission mode.

In an exemplary embodiment, sending transmission mode configuration information for the channel or signal to a receiving end includes: sending the transmission mode configuration information for the channel or signal to the receiving end through a common channel.

In an exemplary embodiment, the coding limitation includes one or more of the following limitations that:

a coding rate is lower than a highest coding rate set by a system;

the coding rate is equal to or lower than a coding rate of user data carried on nearby physical resources and sent to a same receiving end, herein the nearby physical resources include physical resources near each physical resource carrying the non-known data.

The modulation limitation includes one or more of the following limitations:

a modulation order is lower than a highest modulation order set by the system; and for each physical resource carrying the non-known data, the modulation order of the non-known data carried on the physical resources is equal to or lower than a modulation order of user data carried on the nearby physical resources of the physical resource and sent to a same receiving end.

In an exemplary embodiment, the physical resources use a resource element as a unit; each physical resource carrying the non-known data refers to each resource element carrying the non-known data, and the physical resources near the each physical resource refer to other resource elements in a physical resource block where the resource element is located.

In an exemplary embodiment, the transmission method further includes: transmitting data on physical resources of the channel or signal according to the selected transmission mode, herein the physical resources of the channel or signal are distributed on physical time-frequency resources of the system in a distributed manner or in an interval-distribution manner, and a distribution manner of the physical resources of the channel or signal may be the same as or different from that of physical resources of a reference signal.

In an exemplary embodiment, the non-known data refers to control information data and/or user data.

In an exemplary embodiment, the control information data includes at least data about interference data related information.

Accordingly, an embodiment of the present disclosure further provides a sending end including a transmission mode selection module and a transmission module for a channel or signal.

The transmission mode selection module is configured to select one transmission mode from multiple transmission modes configured for a channel or signal, herein the multiple transmission modes include two or three of the following transmission modes: transmitting known data; transmitting non-known data and being subject to a coding limitation and/or a modulation limitation; and transmitting non-known data and not being subject to the coding limitation and the modulation limitation; and the transmission module is configured to send transmission mode configuration information for the channel or signal to a receiving end to indicate the selected transmission mode.

In an exemplary embodiment, the transmission module sending the transmission mode configuration information for the channel or signal to the receiving end includes: sending the transmission mode configuration information for the channel or signal to the receiving end through a common channel.

In an exemplary embodiment, the modulation limitation on the multiple transmission modes selectable by the transmission mode selection module includes one or more of the following limitations that:

a modulation order is lower than a highest modulation order set by a system;

for each physical resource carrying the non-known data, the modulation order of the non-known data carried on the physical resources is equal to or lower than a modulation order of user data carried on the nearby physical resources of the physical resource and sent to a same receiving end.

The coding limitation on the multiple transmission modes selectable by the transmission mode selection module includes one or more of the following limitations that:

a coding rate is lower than a highest coding rate set by the system;

the coding rate is equal to or lower than a coding rate of user data carried on nearby physical resources and sent to a same receiving end, herein the nearby physical resources includes physical resources near each partial physical resource carrying the non-known data;

herein the physical resources use a resource element as a unit; each physical resource carrying the non-known data refers to each resource element carrying the non-known data, and the physical resources near the each physical resource refer to other resource elements in a physical resource block where the resource element is located.

In an exemplary embodiment, the transmission module is further configured to transmit data on physical resources of the channel or signal according to the selected transmission mode, herein the physical resources of the channel or signal are distributed on physical time-frequency resources of the system in a distributed manner or in an interval-distribution manner, and a distribution manner of the physical resources of the channel or signal may be the same as or different from that of physical resources of a reference signal.

In an exemplary embodiment, the non-known data in the multiple transmission modes selectable by the transmission mode selection module refers to control information data and/or user data.

An embodiment of the present disclosure further provides a computer readable storage medium in which a computer program is stored. The computer program includes program instructions, and when the program instructions are executed by a device at a sending end, the device is enabled to execute the method for transmitting control information described above.

The above scheme defines a special channel or signal which is configured with multiple transmission modes. By different transmission modes, different types of data can be transmitted or transmission can be performed in different coding and modulation manners, which makes it possible to select different transmission modes for the channel or signal according to different scenarios. For example, in the case of high signal-to-noise ratio, non-known data can be transmitted in a normal coding and modulation manner to obtain high time-frequency resource utilization; in the case of low signal-to-noise ratio, known data such as a reference signal are transmitted to better perform channel estimation; and in the case of intermediary noise ratio, the non-known data can be transmitted according to a limited coding and modulation manner to balance the channel estimation and the time-frequency resource utilization, to achieve the optimum performance.

BRIEF DESCRIPTION OF THE DRAWINGS

The accompanying drawings are used to provide a further understanding of the present disclosure, constitute a part of the specification, interpret examples of the present disclosure along with specific embodiments of the present disclosure, and are not intended to limit the present disclosure. In the drawings.

DETAILED DESCRIPTION

Figure 1:
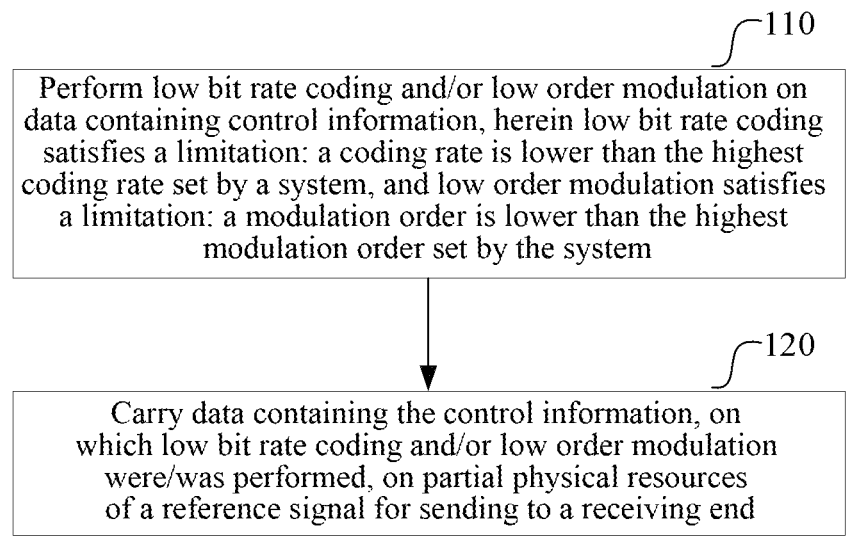
FIG. 1 is a flowchart of a method for transmitting control information according to embodiment one of the present disclosure.

Hereinafter, in conjunction with the accompanying drawings, embodiments of the present disclosure will be described in detail. It should be illustrated that, under the situation of no conflict, embodiments and features in the embodiments in the present application can be freely combined.

As mentioned in the background, data agreed by a sending end and a receiving end (referred to as known data) are transmitted by a reference signal (also referred to as pilot channel in some standards), and are used for channel estimation at the receiving end. The known data do not need to be demodulated at the receiving end, but occupy physical resources, thus reducing a physical resource utilization of a system, further reducing the spectral efficiency of the system.

It is known according to the study that data with low order modulation and/or low bit rate can be demodulated by performing channel estimation based on a small amount of reference signal data when signal-to-noise ratio is high or coherence bandwidth or coherence time of a wireless channel is relatively large.

In the case where a wireless communication system uses high-density reference signal design, partial physical resources of the reference signal may be used to transmit the non-known data with the limited coding and/or modulation (referring to data which are not agreed by the sending end and the receiving end, including control information data and user data) in a scene where the signal-to-noise ratio is high or the coherence bandwidth or coherence time of the wireless channel is relatively large. The receiving end can demodulate the non-known data by performing channel estimation through the rest of the reference signal data, and then may regard the non-known data as reference signals to perform joint channel estimation with the non-known data and the original rest of the reference signal data, thus the channel estimation precision can be further improved, and the receiving end can demodulate the data which is transmitted in the channel and not subject to the limitation.

Control information is also known as overhead information in some standards. Thus, the control information also refers to the overhead information, or the control information refers to information other than the reference signal and the user data (data transmitted through a data channel).

In an embodiment, the transmitted non-known data with the limited coding and/or modulation are data containing the control information.

In an embodiment, the control information includes: interference data related information, a rank indication (RI), a precoding matrix indicator (PMI), a modulation coding scheme (MCS), and the like. Herein, the interference data related information may include a related indication of the number of interference users, information about a cell to which the interference data belongs, cell ID, information about a virtual cell to which the interference data belongs, virtual cell ID, interference data power-related information, interference data RI, interference data PMI, a modulation order of the interference data, a transmission mode of the interference data, information about a reference signal port to which the interference data belongs, interference data resource allocation information, and the like.

Embodiment One

A method for transmitting control information in the embodiment is applied to a sending end, and as shown in FIG. 1, the method for transmitting control information includes the following steps 110-120.

In step 110, low bit rate coding and/or low order modulation are/is performed on data containing the control information. Herein, the low bit rate coding satisfies a limitation: a coding rate is lower than the highest coding rate set by a system, and the low order modulation satisfies a limitation: a modulation order is lower than the highest modulation order set by the system.

For the limitation on the coding rate: the coding rate is lower than the highest coding rate set by the system, and one or more optional coding rates lower than the highest coding rate may be given; if an upper limit is set, the upper limit of the coding rate of the low bit rate coding may be set as the second highest coding rate or a coding rate lower than the second highest coding rate set by the system. For the limitation on the modulation order: the modulation order is lower than the highest modulation order set by the system, and one or more optional modulation orders lower than the highest modulation order may be given; if an upper limit is set, the upper limit of the modulation order may be set as the second highest modulation order or a modulation order lower than the second highest modulation order set by the system.

The data containing the control information may be control information data, and may also be data obtained after the control information data and the reference signal data are combined. For example, performing the low bit rate coding on the data containing the control information refers to performing the low bit rate coding on the control information data; and performing the low order modulation on the data containing the control information may refer to performing the low order modulation on the control information, or performing the low modulation on the data obtained after the control information data and the reference signal data are combined.

In the embodiment, the low bit rate coding also satisfies a limitation: the coding rate is equal to or lower than a coding rate of user data carried on nearby physical resources and sent to the same receiving end, the nearby physical resources include physical resources near each physical resource in the partial physical resources. The data containing the control information is encoded uniformly. When setting specifically, the upper limit of the coding rate of the low bit rate coding may be set as a coding rate of the user data carried on the nearby physical resources and sent to the same receiving end or a lower coding rate; or the upper limit may also be set as a coding rate of the user data carried on the nearby physical resources and sent to all receiving ends or a lower coding rate.

Assuming that the highest coding rate set by the system is 3/4, if there are user data sent to a terminal A and user data sent to a terminal B through a physical downlink shared channel (PDSCH), which are carried on physical resources near the partial physical resources of the reference signal, herein the coding rate of the user data for the terminal A is 1/2 and the coding rate of the user data for the terminal B is 1/3, then the upper limit of the coding rate of the control information data sent to the terminal A and transmitted in the partial physical resources of the reference signal may be 1/2 or 1/3 or lower, but no more than 1/2.

In the embodiment, the low order modulation also satisfies a limitation: for each physical resource of the partial physical resources, the modulation order of data containing the control information carried on the physical resource is equal to or lower than that of the user data carried on nearby physical resources of the physical resource and sent to the same receiving end. The modulation orders of the data containing the control information carried on different physical resources may be different and may be compared respectively. When setting specifically, the upper limit of the modulation order of the data containing the control information carried on each physical resource may be a modulation order of the user data, which are carried on nearby physical resources of the physical resource and sent to the same receiving end, or a lower modulation order; or the upper limit may be a modulation order of the user data, which are carried on nearby physical resources of the physical resource and sent to all the receiving ends, or a lower modulation order.

Assuming the highest modulation order set by the system and the upper limit of the modulation order of the data containing the control information carried on each physical resource is a modulation order of the user data carried on nearby physical resources of the physical resource and sent to the same receiving end. If a modulation mode of the user data sent to the terminal A and transmitted in the physical downlink shared channel (PDSCH) is QPSK, a modulation mode of the data containing the control information sent to the terminal A and transmitted in the nearby physical resources of the reference signal may be QPSK, but not 16QAM and 64QAM. If the modulation mode of the user data sent to the terminal A and transmitted in the physical downlink shared channel (PDSCH) is 64QAM, the modulation mode of the control information data sent to the terminal A and transmitted in the nearby physical resources of the reference signal may be QPSK and 16QAM, but not 64QAM, since 64QAM is the highest modulation order of the system.

In the present embodiment, the physical resources use a resource element (RE) as a unit; each physical resource of the partial physical resources refers to each resource element in the partial physical resources, and the physical resources near each physical resource refer to other resource elements in a physical resource block where the resource element is located. However, the present disclosure is not limited thereto, and a combination of multiple resource elements may be used as a unit, and the nearby physical resources may include resource elements in neighbor physical resource blocks.

In step 120, the data containing the control information, on which the low bit rate coding and/or the low order modulation have/has been performed, are carried on the partial physical resources of the reference signal to send to the receiving end.

In the embodiment, the partial physical resources of the reference signal are distributed on the physical resources of the reference signal in a distributed manner or in an interval-distribution manner.

The combination of the control information data and the reference signal data is not limited to a specific manner. Of course, when performing combination processing, only when the different control information data and the same reference signal data are combined to map as different data, the receiving end can analyze out them. An example of the combination processing for the control information data and the reference signal data is given below.

In this example, a data mapping relationship for the combination processing for the reference signal data and the control information data (which may be an operation or a defined mapping relationship) is shown in Table 1 below. According to Table 1, it is assumed that the demodulated data at the receiving end is 00, and if the reference signal data (known) is 00, the control information data is 00; if the reference signal data is 01, the control information data is 11; if the reference signal data is 10, the control information data is 10; and if the reference signal data is 11, the control information data is 01, and so forth.

TABLE 1

| Reference information data | Control signal data | Data obtained after the reference signal data and the control information data are combined |
|---|---|---|
| 00 | 00 | 00 |
|  | 01 | 01 |
|  | 10 | 10 |
|  | 11 | 11 |
| 01 | 00 | 01 |
|  | 01 | 10 |
|  | 10 | 11 |
|  | 11 | 00 |
| 10 | 00 | 10 |
|  | 01 | 11 |
|  | 10 | 00 |
|  | 11 | 01 |
| 11 | 00 | 11 |
|  | 01 | 00 |
|  | 10 | 01 |
|  | 11 | 10 |

Figure 2:
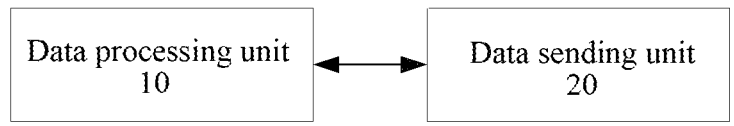
FIG. 2 is a structural block diagram of a transmission module of a sending end according to the embodiment one of the present disclosure.

Correspondingly, the sending end of the present embodiment includes a processor and a program storage device, and further includes a transmission module. As shown in FIG. 2, the transmission module includes a data processing unit 10 and a data sending unit 20.

The data processing unit 10 is suitable for performing low bit rate coding and/or low order modulation on data containing control information, herein the low bit rate coding satisfies a limitation: a coding rate is lower than the highest coding rate set by a system, and the low order modulation satisfies a limitation: a modulation order is lower than the highest modulation order set by the system.

The data sending unit 20 is suitable for carrying the data containing the control information, on which the low bit rate coding and/or the low order modulation have/has been performed, on partial physical resources of a reference signal to send to a receiving end.

In the embodiment, when the data processing unit performs the low bit rate coding on the data containing the control information, a limitation is further satisfied: the coding rate is equal to or lower than a coding rate of user data carried on nearby physical resources and sent to the same receiving end, herein the nearby physical resources include physical resources near each partial physical resource.

In the embodiment, when the data processing unit performs the low order modulation on the data containing the control information, a limitation is further satisfied: for each physical resource of the partial physical resources, the modulation order of the data containing the control information carried on the physical resource is equal to or lower than a modulation order of the user data carried on the nearby physical resources of the physical resource and sent to the same receiving end.

In the embodiment, the physical resources use a resource element as a unit; each physical resource of the partial physical resources refers to each resource element in the partial physical resources, and the physical resources near the each physical resource refer to other resource elements in a physical resource block where the resource element is located.

In the embodiment, the data sending unit carries the data containing the control information, on which the low bit rate coding and/or the low order modulation have/has been performed, on the partial physical resources of the reference signal to send to the receiving end, herein the partial physical resources of the reference signal are distributed on the physical resources of the reference signal in a distributed manner or in an interval-distribution manner.

In the embodiment, the data processing unit performing the low code rate coding on the data containing the control information includes: performing the low bit rate coding on control information data, and the data processing unit performing the low order modulation on the data containing the control information includes: performing the low order modulation on the control information data, or performing the low order modulation on data obtained after the control information data and reference signal data are combined.

How the partial physical resources of the reference signal are distributed over the physical resources of the reference signal in a distributed manner or in an interval-distribution manner will be described below by way of examples.

Example One

Figures 3A, 3B:
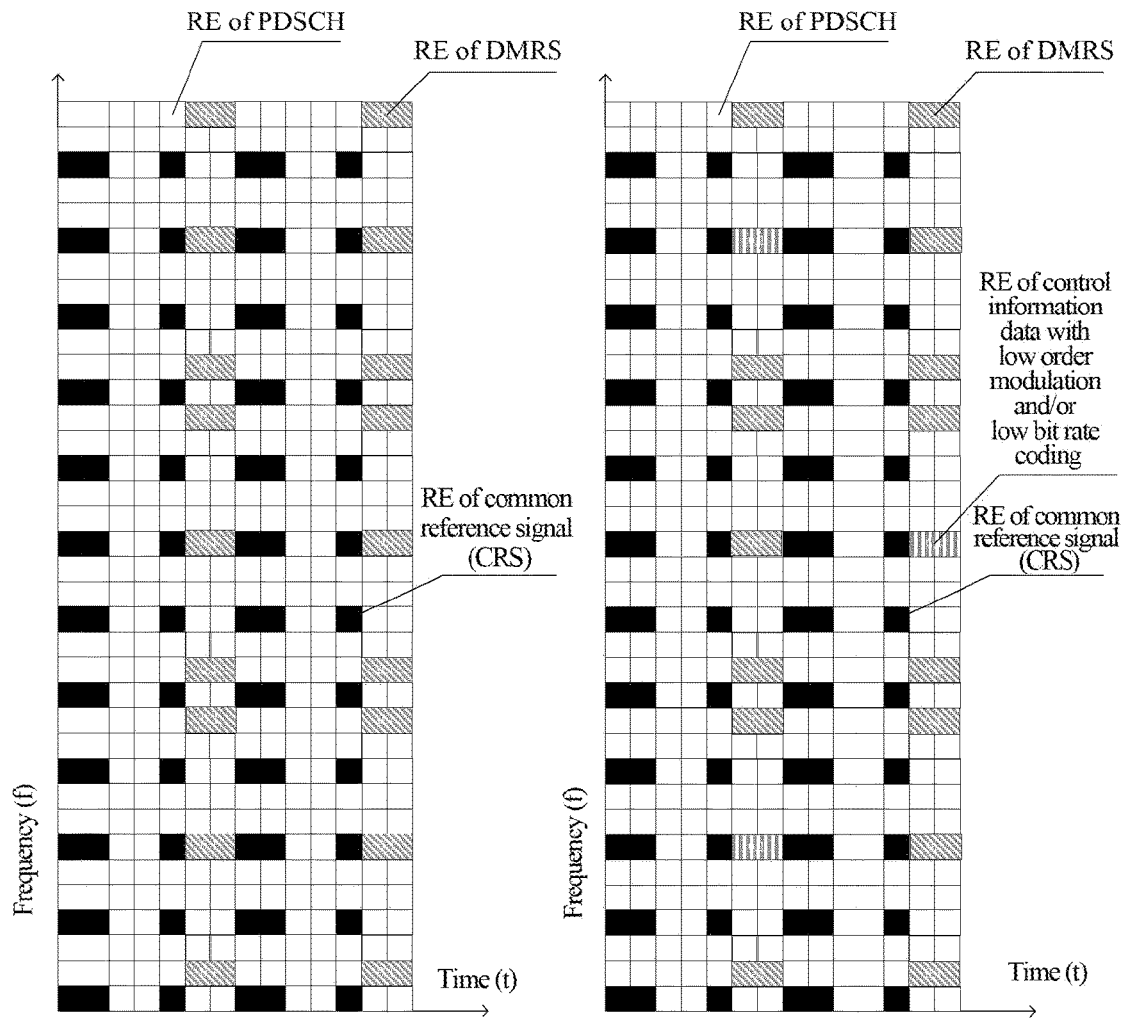
FIGS. 3 (*a*), 3 (*b*), and 3 (*c*) show respectively, in one example, a diagram in which all REs of a DMRS reference signal transmit reference signal data, and a diagram in which partial REs of the DMRS reference signal are used to transmit control information data with low order modulation and/or low bit rate coding and are distributed in a distributed manner, and a diagram in which partial REs of the DMRS reference signal are used to transmit the control information data with low order modulation and/or low bit rate coding and are distributed in a centralized manner.
Figure 3C:
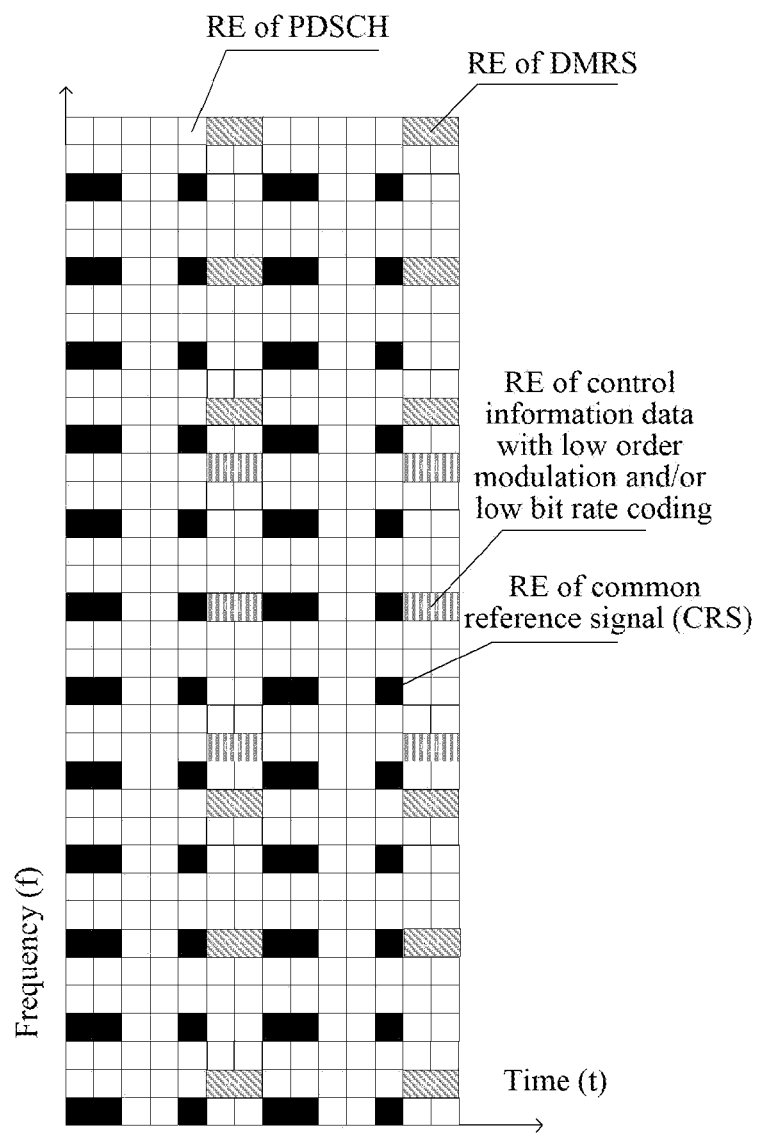

In FIG. 3 (a), FIG. 3 (b) and FIG. 3 (c), the abscissa is time t and the ordinate is frequency f. The figures only show an example of physical resources where there are one subframe in the time domain and 3 PRBs in the frequency domain. One subframe in the time domain contains 14 REs, and a PRB in the frequency domain contains 12 REs and 3PRBs contain 36 REs. As shown in the figures, a data demodulation reference signal (DMRS) is distributed in a distributed manner on physical time-frequency resources. These figures are described by taking a DMRS of a single antenna port as an example. The distributed manner requires that positions of REs where the reference signal of an antenna port is located cannot be completely continuous in the time-frequency domain. The number of the continuous positions of the REs in the DMRS of the figure is 2, which is consistent with the requirements of the distributed manner.

FIG. 3 (a) shows a situation where the REs in which the DMRS is located all transmit reference signal data.

FIG. 3 (b) shows that partial REs of the DMRS (an embodiment of the present disclosure may also be partial REs of another reference signal) transmit control information data with low order modulation and/or low bit rate, and the partial physical resources are distributed on the physical resources of the reference signal in a distributed manner. It can be seen from the figure that the distribution of these REs in the original all DMRS REs is as follows: the number of consecutive REs is 2, in other words, part of REs are taken out from the original all DMRS REs with a manner in which the number of REs which are taken consecutively is at most 2, and are used to transmit the control information data with low order modulation or low bit rate, as shown in the figure, thus the requirement of distribution in the distributed manner is satisfied.

Although FIG. 3 (c) also shows that part of the REs of the DMRS transmit control information data with low order modulation and/or low bit rate, however these REs are concentrated together with respect to the original DMRS REs (all DMRS REs can be concentrated together to observe the distribution manner of part of the DMRS). Using such concentrated distribution manner, it is relatively difficult for the receiving end to demodulate the data with low-order modulation or low bit rate, thus joint channel estimation will be further affected, which will greatly decrease demodulation performance of the receiving end for other data.

Example Two

Figure 4A:
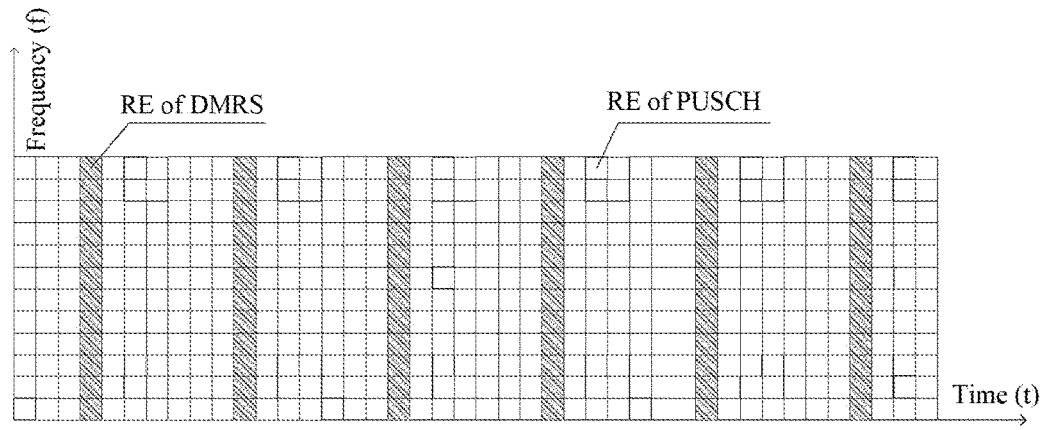
FIGS. 4 (a), 4 (b) and 4 (c) show respectively, in another example, a diagram in which all REs of a DMRS reference signal transmit reference signal data, and a diagram in which partial REs of the DMRS reference signal are used to transmit control information data with low order modulation and/or low bit rate coding and are distributed in an interval-distribution manner, and a diagram in which partial REs of the DMRS reference signal are used to transmit the control information data with low order modulation and/or low bit rate coding and are distributed in a centralized manner.
Figure 4B:
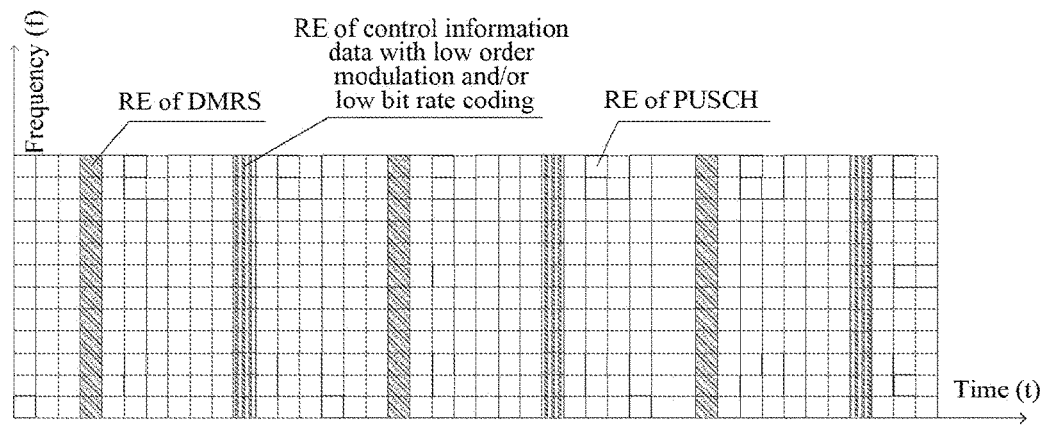
Figure 4C:
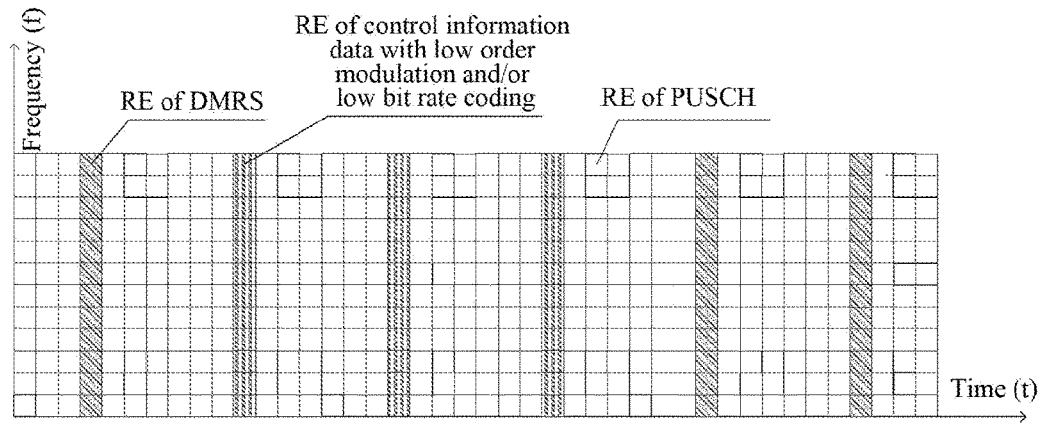

In FIG. 4 (a), FIG. 4 (b) and FIG. 4 (c), the abscissa is time t and the ordinate is frequency f. The figures only show an example of physical resources where there are 3 subframes in the time domain and 1 PRB in the frequency domain. One subframe in the time domain contains 14 REs, and 3 PRBs contain 42 REs; and a PRB in the frequency domain contains 12 REs. As shown in the figures, REs of a data demodulation reference signal (DMRS) are distributed in an interval-distribution manner on physical time-frequency resources. These figures are described by taking a DMRS of a single antenna port as an example. The interval-distribution manner requires that positions of REs where the reference signal of an antenna port is located cannot be continuous in the frequency domain if they are continuous in the time domain, positions of REs where the reference signal of an antenna port is located cannot be continuous in the time domain if they are continuous in the frequency domain. The positions of the REs of the DMRS in these figures are continuous in the frequency domain while they are discontinuous in the time domain, which is consistent with the requirement of the interval-distribution manner.

FIG. 4 (a) shows a situation where the REs of the DMRS all transmit reference signal data.

FIG. 4 (b) shows that part of the REs of the DMRS transmit control information data with low order modulation and/or low bit rate, and the partial physical resources are distributed over the physical resources of the reference signal in a distributed manner. It can be seen from the figure that the distribution of these REs in the original DMRS REs is as follows: they are continuous in the frequency domain while they are discontinuous in the time domain, thus the requirement of the interval-distribution is satisfied.

Although FIG. 4 (c) also shows that part of the REs of the DMRS transmit control information data with low order modulation and/or low bit rate, these REs are concentrated together. With such a concentrated distribution manner, it is relatively difficult for the receiving end to demodulate the data with low-order modulation or low bit rate, thus joint channel estimation will be further affected, which will greatly decrease demodulation performance of the receiving end for other data.

The present embodiment carries the control information on the partial physical resources of the reference signal and limits its coding and modulation, to improve the transmission efficiency of physical resources without increasing the number of resources occupied by the reference signal.

Embodiment Two

In the present embodiment, the control information has multiple transmission modes and selection can be performed, one of which is to transmit the control information on the partial physical resources of a reference signal.

Figure 5:
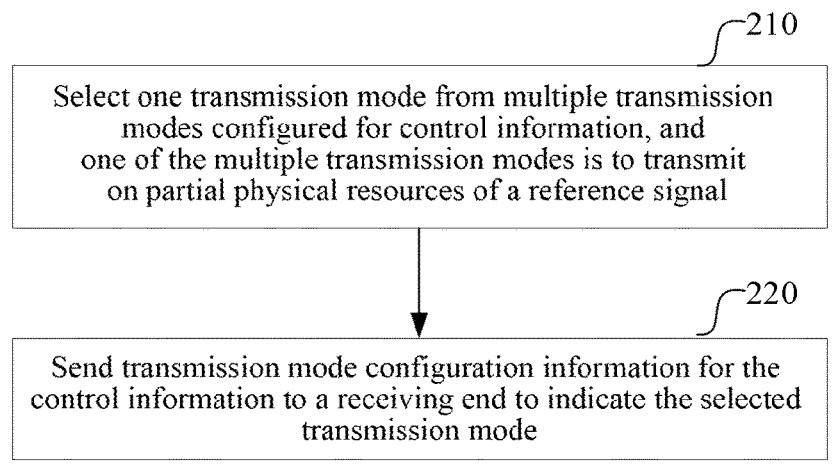
FIG. 5 is a flowchart of a method for transmitting control information according to embodiment two of the present disclosure.

As shown in FIG. 5, a method for transmitting control information in accordance with an embodiment is applied to a sending end and includes the following steps 210-220.

In step 210, a transmission mode is selected from multiple transmission modes configured for the control information, herein one of the multiple transmission modes is to transmit on partial physical resources of a reference signal.

The control information may be one or more types of control information defined in the standard. When multiple types of control information have multiple types of selectable transmission modes, the multiple transmission modes of various control information may be same or different. In addition to a transmission mode of transmitting on the partial physical resources of the reference signal, the other transmission modes among various transmission modes may be other transmission modes defined in the standard, such as transmitting in the physical downlink control channel (PD-CCH) or the enhanced Physical downlink control channel (ePDCCH), and the like.

In step 220, transmission mode configuration information for the control information is sent to a receiving end to indicate the selected transmission mode.

The transmission mode configuration information for the control information may be transmitted to the receiving end through a common channel such as broadcast information. For example, the transmission mode configuration information for the control information may be a value corresponding to the selected transmission mode, and the receiving end may determine the selected transmission mode based on the value to receive the control information on a corresponding channel or signal.

If the transmission mode selected in step 210 is to transmit on the partial physical resources of the reference signal, the sending end may transmit the control information data in accordance with the method for transmitting the control information of the embodiment one.

Figure 6:
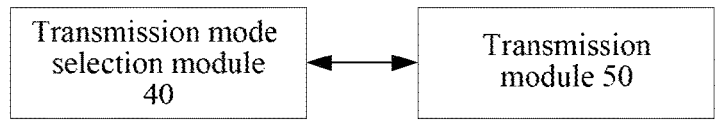
FIG. 6 is a structural block diagram of a module of a sending end according to the embodiment two of the present disclosure.

A sending end of the present embodiment includes a processor and a program storage device, as shown in FIG. 6, and further includes a transmission mode selection module 40 for control information and a transmission module 50 for control information.

The transmission mode selection module 40 is suitable for selecting a transmission mode from multiple transmission modes configured for the control information, herein one of the multiple transmission modes is to transmit on partial physical resources of a reference signal.

The transmission module 50 is suitable for sending transmission mode configuration information for the control information to the receiving end to indicate the selected transmission mode.

In the embodiment, the transmission module includes the data processing unit and the data sending unit in the embodiment one, and activates the data processing unit and the data sending unit to transmit the data of the control information when the selected transmission mode is to transmit on the partial physical resources of the reference signal.

The present embodiment provides configurations for multiple transmission modes for control information. In a scene where a signal-to-noise ratio is high or coherence bandwidth or coherent time length of a wireless channel is relatively large, a transmission mode of transmitting the control information on the partial physical resources of the reference signal may be selected to improve the utilization of time-frequency resources, and the coding and modulation manners for the control information may be limited by using the way in the embodiment one. The receiving end may demodulate the control information data by performing channel estimation through the rest of the reference signal data, and then regard the control information data as a reference signal to perform joint channel estimation with the control information data and the original rest of the reference signal data, thus the channel estimation precision can be further improved, and the receiving end can demodulate data transmitted in a channel, which is not subject to the limitation. In a scene where the signal-to-noise ratio is low or the coherence bandwidth or coherent time length of the wireless channel is relatively small, the control information may be configured to be transmitted in the control channel without occupying the physical resources of the reference signal to ensure the channel estimation precision.

Embodiment Three

To improve the channel estimation precision at the receiving end and to improve the transmission efficiency of the physical resources of the system, the present embodiment has designed a specific channel or signal with respect to a situation where a wireless communication system uses a low density reference signal design. The channel or signal has a variety of transmission mode configurations. According to different scenes, different transmission modes may be selected to transmit different data, or data are transmitted in different coding and modulation modes. It should be noted that a channel sometimes is referred to as a signal. For example, in LTE, a control channel is called a channel, and a reference signal is called a signal, and in other standards, a reference signal is also known as a pilot channel.

Figure 7:
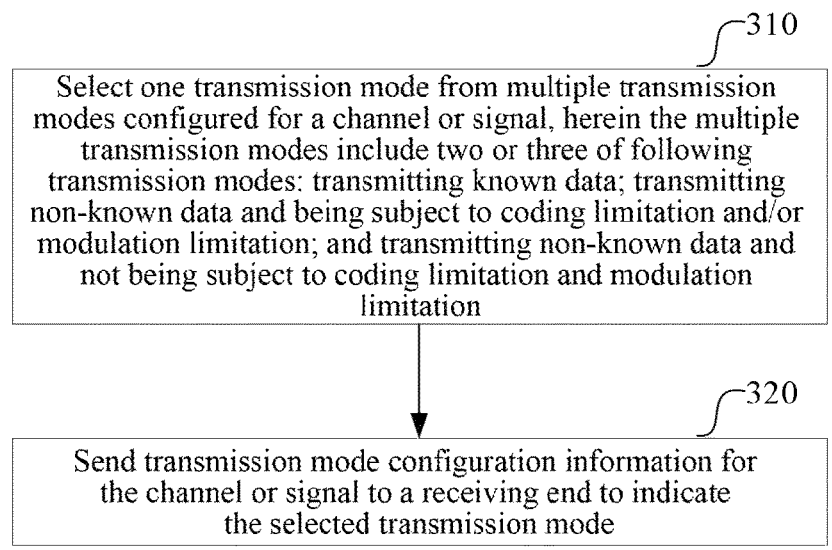
FIG. 7 is a flowchart of a method for transmitting a channel or signal according to embodiment three of the present disclosure.

As shown in FIG. 7, a method for transmitting a channel or signal in the present embodiment is applied to a sending end, and includes the following steps 310-320.

In step 310, a transmission mode is selected from multiple transmission modes configured for a channel or signal, herein the multiple transmission modes include two or three of the following transmission modes: transmitting known data; transmitting non-known data and being subject to a coding limitation and/or a modulation limitation; and transmitting non-known data and not being subject to the coding limitation and the modulation limitation.

Herein, the second transmission mode is referred to as transmitting the limited non-known data, and the third transmission mode is referred to as transmitting the unlimited non-known data. The 'unlimited' particularly refers to not being subject to the coding limitation and the modulation limitation in the second transmission mode, and does not exclude other possible limitations.

In the present embodiment, the above known data is reference signal data, but the present disclosure is not limited thereto. The above non-known data may be control information data and/or user data, or data obtained after the control information data and/or the user data are combined with the known data. In the embodiment, the control information data may include interference data related information, a rank indication (RI), a precoding matrix indicator (PMI), a modulation and coding scheme (MCS), and the like. Herein, the interference data related information may include a related indication for the number of interference users, information about a cell to which the interference data belongs, Cell ID, information about a virtual cell to which the interference data belongs, Virtual Cell ID, interference data power-related information, interference data RI, interference data PMI, a modulation order of the interference data, a transmission mode of the interference data, information about reference signal port to which the interference data belongs, interference data resource allocation information, and the like.

In the embodiment, the coding limitation includes one or more of the following limitations:

a coding rate is lower than the highest coding rate set by a system;

the coding rate is equal to or lower than a coding rate of user data carried on nearby physical resources and sent to the same receiving end, herein the nearby physical resources includes physical resources near each partial physical resource carrying the non-known data.

In the embodiment, the modulation limitation includes one or more of the following limitations:

a modulation order is lower than the highest modulation order set by the system;

for each physical resources carrying the non-known data, the modulation order of the non-known data carried on the physical resource is equal to or lower than a modulation order of user data carried on the nearby physical resources of the physical resource and sent to the same receiving end.

In the present embodiment, the physical resources use a resource element as a unit; each physical resources carrying the non-known data refers to each resource element carrying the non-known data, and the physical resources near the each physical resources refer to other resource elements in a physical resource block where the resource element is located. But the present disclosure is not limited thereto.

In step 320, transmission mode configuration information for the channel or signal is sent to the receiving end to indicate the selected transmission mode.

The transmission mode configuration information for the channel or signal may be sent to the receiving end through a common channel such as a broadcast channel. The information transmitted by the common channel is not sent to a single receiving end.

In the embodiment, the transmission method further includes: transmitting data on physical resources of the channel or signal according to the selected transmission mode, herein the physical resources of the channel or signal are distributed over physical time-frequency resources of the system in a distributed manner or in an interval-distribution manner. The distribution manner of physical resources of the channel or signal may be the same as or different from that of physical resources of the reference signal. In the case where the distribution manners are the same, when physical resources of the reference signal are distributed on the physical time-frequency resources in a distributed manner, the physical resources of the channel or signal are also distributed on the physical time-frequency resources in the distributed manner; when physical resources of the reference signal are distributed on the physical time-frequency resources in an interval-distribution manner, the physical resources of the channel or signal are also distributed on the physical time-frequency resources in the interval-distribution manner.

Figure 8:
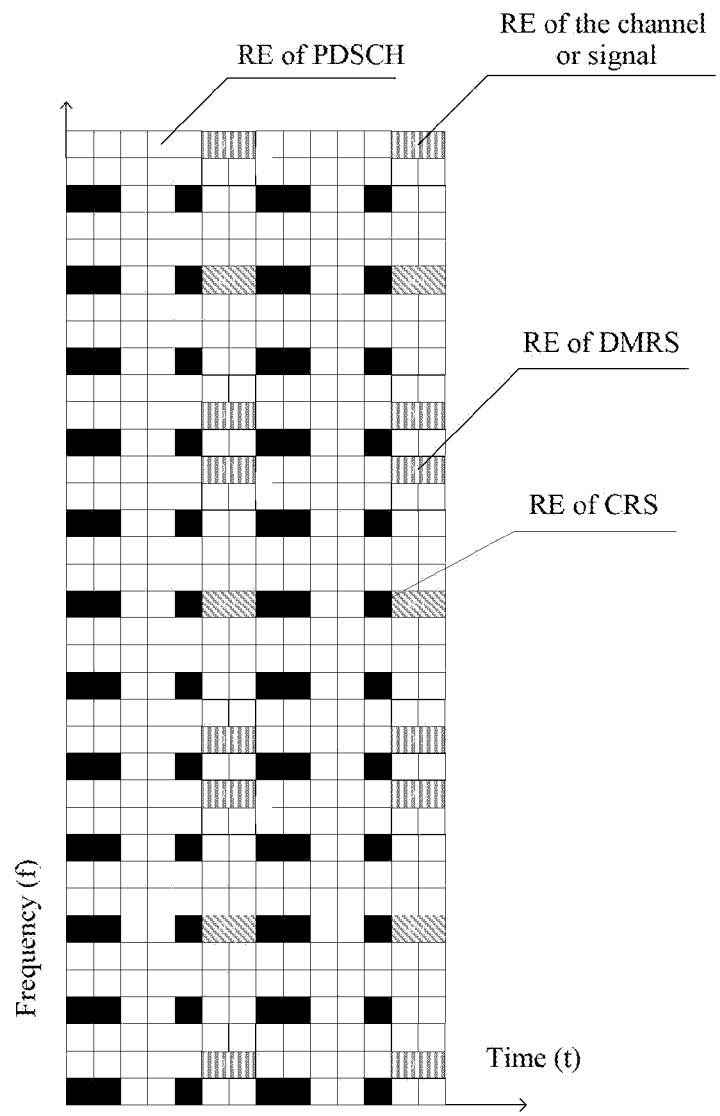
FIG. 8 is a schematic diagram of REs of a channel or signal according to the embodiment three of the present disclosure.

In FIG. 8, the abscissa is time t and the ordinate is frequency f. The figure only shows an example of physical resources where there are one subframe in the time domain and 3 PRBs in the frequency domain. A subframe in the time domain contains 14 REs, a PRB in the frequency domain contains 12 REs and 3 PRBs contain 36 REs. In the figure, physical resources of a reference signal DMRS are distributed in a distributed manner on physical time-frequency resources, and the channel or signal is also distributed in the distributed manner on the physical time-frequency resources. The transmission mode of the channel or signal may be set as transmitting reference signal data, transmitting limited non-known data, or transmitting limited non-known data.

In the case where the above-described multiple transmission modes include the above-described three transmission modes, a signal-to-noise ratio or a coherence bandwidth or coherence time of a wireless channel may include three situations according to the present embodiment, and the transmission mode may be configured in the following manners.

In a scene where the signal-to-noise ratio is low or the coherent bandwidth or coherence time length in the wireless channel is small, more reference signal data are required to perform channel estimation such that data of a data area can be demodulated well. Thus, the transmission mode of the channel or signal may be set as transmitting the reference signal data in this scene. The receiving end performs joint channel estimation with the reference signal and original reference signal data existing in the system, such that the channel estimation precision can be further improved, and the receiving end can demodulate the data transmitted in the channels well. In this case, the control information data may be transmitted in the control channel.

In a scene where the signal-to-noise ratio is moderate or the coherent bandwidth or coherence time length in the wireless channel is moderate, channel estimation is performed through a small amount of reference signal data, such that data with low order modulation or low bit rate can be demodulated. Thus, the transmission mode of the channel or signal may be set as transmitting the non-known data and being subject to the set modulation limitation and/or coding limitation in this scene. After performing channel estimation through the existing reference signal data of the system, the receiving end demodulates the limited data, and then regards the limited data as the reference signal to perform joint channel estimation with the limited data and the original reference signal data, thus the channel estimation precision can be further improved, and the receiving end can demodulate the non-limited data transmitted in the channel.

In a scene where the signal-to-noise ratio is high or the coherent bandwidth or coherence time length in the wireless channel is large, channel estimation is performed through a small amount of reference signal data, such that data with normal modulation and coding can be demodulated. Thus the transmission mode of the channel or signal may be set as transmitting the non-known data and not being subject to the coding limitation and modulation limitation in this scene. The receiving end can demodulate the non-limited, i.e., normally modulated and coded, data by performing channel estimation through the existing reference signal data of the system.

When the configured multiple transmission modes described above include two transmission modes of multiple transmission modes, three situations are included:

A. The configured two transmission modes are: transmitting known data; and transmitting non-known data and being subject to the coding limitation and/or the modulation limitation;

B. The configured two transmission modes are: transmitting known data; and transmitting non-known data and not being subject to the coding limitation and the modulation limitation; and C. The configured two transmission modes are: transmitting non-known data and being subject to the coding limitation and/or the modulation limitation; and transmitting non-known data and not being subject to the coding limitation and the modulation limitation.

When the multiple transmission modes described above include two transmission modes described above, a signal-to-noise ratio or a coherence bandwidth or coherence time of a wireless channel may include three situations according to the present embodiment, and the transmission mode may be configured in the following manners:

When the two transmission modes belong to situation A, the transmission mode of the channel or signal is set as transmitting the reference signal data in the scene where the signal-to-noise ratio is low or the coherence bandwidth or the coherence time of the wireless channel is small; the transmission mode of the channel or signal is set as transmitting the non-known data and being subject to the coding limitation and/or the modulation limitation in the scene where the signal-to-noise ratio is high or the coherence bandwidth or the coherence time of the wireless channel is large.

When the two transmission modes belong to situation B, the transmission mode of the channel or signal is set as transmitting the reference signal data in the scene where the signal-to-noise ratio is low or the coherence bandwidth or the coherence time of the wireless channel is small; the transmission mode of the channel or signal is set as transmitting the non-known data and not being subject to the coding limitation and the modulation limitation in the scene where the signal-to-noise ratio is high or the coherence bandwidth or the coherence time of the wireless channel is large.

When the two transmission modes belong to situation C, the transmission mode of the channel or signal is set as transmitting the non-known data and being subject to the coding limitation and/or the modulation limitation in the scene where the signal-to-noise ratio is low or the coherence bandwidth or the coherence time of the wireless channel is small; the transmission mode of the channel or signal is set as transmitting the non-known data and not being subject to the coding limitation and the modulation limitation in the scene where the signal-to-noise ratio is high or the coherence bandwidth or the coherence time of the wireless channel is large.

Figure 9:
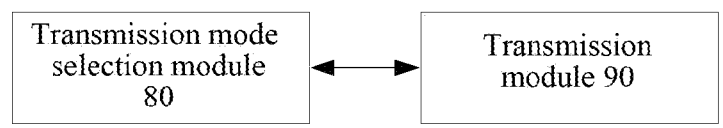
FIG. 9 is a structural block diagram of a module of a sending end according to the embodiment three of the present disclosure.

Accordingly, a sending end of the present embodiment includes, as shown in FIG. 9, a processor and a program storage device, and further includes a transmission mode selection module 80 and a transmission module 90, for channel or signal.

The transmission mode selection module 80 is suitable for selecting a transmission mode from multiple transmission modes configured for the channel or signal, herein the multiple transmission modes include two or three of the following transmission modes: transmitting known data; transmitting non-known data and being subject to a coding limitation and/or a modulation limitation; and transmitting non-known data and not being subject to the coding limitation and the modulation limitation.

The transmission module 90 is suitable for sending transmission mode configuration information for the channel or signal to a receiving end to indicate the selected transmission mode.

In the embodiment, the transmission module sending transmission mode configuration information for the channel or signal to a receiving end includes: sending the transmission mode configuration information for the channel or signal to the receiving end through a common channel.

In the embodiment, the modulation limitation on the multiple transmission modes selectable by the transmission mode selection module includes one or more of the following limitations:

a modulation order of the non-known data is lower than the highest modulation order set by a system;

for each physical resource carrying the non-known data, the modulation order of the non-known data carried on the physical resource is equal to or lower than a modulation order for user data carried on the nearby physical resources of the physical resource and sent to the same receiving end.

The coding limitation on the multiple transmission modes selectable by the transmission mode selection module includes one or more of the following limitations:

a coding rate of the non-known data is lower than the highest coding rate set by the system;

a coding rate of the non-known data is equal to or lower than a coding rate of user data carried on nearby physical resources and sent to the same receiving end, herein the nearby physical resources includes physical resources near each physical resource carrying the non-known data.

The physical resources use a resource element as a unit; and each physical resource carrying the non-known data refers to each resource element carrying the non-known data, herein the physical resources near the each physical resource refer to other resource elements in a physical resource block where the resource element is located.

In the embodiment, the transmission module is further configured to transmit data on physical resources of the channel or signal according to the selected transmission mode, herein the physical resources of the channel or signal are distributed on physical time-frequency resources of the system in a distributed manner or in an interval-distribution manner, and the distribution manner of the physical resources of the channel or signal is the same as or different from that of the physical resources of the reference signal.

In the embodiment, the non-known data in the multiple transmission modes selectable by the transmission mode selection module refers to control information data and/or user data.

A specific channel or signal designed by the present embodiment may select different transmission modes (such as transmitting different data, transmitting in different coding and modulation manners) according to different scenes to balance requirements of channel estimation and transmission efficiency, and obtain the best performance. In the case where the number of resources occupied by the reference signal does not increase or even decrease, the transmission efficiency of the physical resources can be improved, thereby improving the system capacity.

Those ordinarily skilled in the art can understand that all or some of steps of the abovementioned method may be completed by the programs instructing the relevant hardware, and the programs may be stored in a computer-readable storage medium, such as read only memory, magnetic or optical disk. In an exemplary embodiment, all or some of the steps of the abovementioned embodiments may also be implemented by using one or more integrated circuits. Accordingly, each module/unit in the abovementioned embodiments may be realized in a form of hardware, or in a form of software function modules. The present disclosure is not limit to any specific form of the combination of the hardware and software.

The above description is only alternative embodiments of the present disclosure and not intended to limit the present disclosure, and for a person in the field, the present disclosure can have various modifications and changes. Any modification, equivalent replacement, improvement and the like made within the spirit and principle of the present disclosure shall be still included in the protection scope of the present disclosure.

INDUSTRIAL APPLICABILITY

The specific channel or signal designed by the present embodiment can select different transmission modes according to different scenes to balance channel estimation and transmission efficiency, and obtain the optimum performance. In the case where the number of resources occupied by a reference signal does not increase or even decrease, the transmission efficiency of the physical resources can be improved, thereby improving the system capacity.

What we claimed is:

1. A method for transmitting control information, applied to a sending end, comprising:
   selecting one transmission mode from a plurality of transmission modes configured for control information, wherein one of the plurality of transmission modes is to transmit on partial physical resources of a reference signal; and
   sending transmission mode configuration information for the control information to a receiving end to indicate the selected transmission mode.

2. The method according to claim 1, wherein,
   sending transmission mode configuration information for the control information to a receiving end comprises: sending the transmission mode configuration information for the control information to the receiving end through a common channel,
   when the selected transmission mode is to transmit on the partial physical resources of the reference signal; the transmission method further comprises: transmitting data of the control information according to a transmission scheme.

3. The method according to claim 2, wherein,
   the transmission scheme comprises:
   performing low bit rate coding and/or low order modulation on data containing the control information, wherein the low bit rate coding satisfies a limitation that: a coding rate is lower than a highest coding rate set by a system, and the low order modulation satisfies a limitation that: a modulation order is lower than a highest modulation order set by the system; and
   carrying the data containing the control information, on which the low bit rate coding and/or the low order modulation have/has been performed, on partial physical resources of a reference signal to send to a receiving end.

4. The method according to claim 3, wherein
   the low bit rate coding also satisfies a limitation that: the coding rate is equal to or lower than a coding rate of user data carried on nearby physical resources and sent to a same receiving end, wherein the nearby physical resources comprise physical resources near each physical resource of the partial physical resources;
   the low order modulation also satisfies a limitation that: for each physical resource of the partial physical resources, a modulation order of the data containing the control information carried on the physical resource is equal to or lower than a modulation order of the user data carried on nearby physical resources of the physical resource and sent to a same receiving end;
   wherein the physical resources use a resource element as a unit; each physical resource of the partial physical resources refers to each resource element in the partial physical resources, and the physical resources near the each physical resource refer to other resource elements in a physical resource block where the resource element is located.

5. The method according to claim 3, wherein
   the partial physical resources of the reference signal are distributed on physical resources of the reference signal in a distributed manner or in an interval-distribution manner.

6. The method according to claim 3, wherein
   performing low code rate coding on data containing the control information comprises: performing the low bit rate coding on control information data, and
   performing low order modulation on data containing the control information comprises: performing the low-order modulation on the control information data; or performing the low-order modulation on data obtained after combining the control information data and reference signal data,
   and,
   the control information data comprises at least data about interference data related information.

7. A method for transmitting a channel or signal, applied to a sending end, comprising:
   selecting one transmission mode from a plurality of transmission modes configured for a channel or signal, wherein the plurality of transmission modes comprise two or three of the following transmission modes: transmitting known data; transmitting non-known data and being subject to a coding limitation and/or a modulation limitation; and transmitting non-known data and not being subject to the coding limitation and the modulation limitation; and
   sending transmission mode configuration information for the channel or signal to a receiving end to indicate the selected transmission mode.

8. The method according to claim 7, wherein
   sending transmission mode configuration information for the channel or signal to a receiving end comprises: sending the transmission mode configuration information for the channel or signal to the receiving end through a common channel.

9. The method according to claim 7, wherein
the coding limitation comprises one or more of the following limitations that:
a coding rate is lower than a highest coding rate set by a system;
the coding rate is equal to or lower than a coding rate of user data carried on nearby physical resources and sent to a same receiving end, wherein the nearby physical resources comprise physical resources near each physical resource carrying the non-known data;
the modulation limitation comprises one or more of the following limitations that:
a modulation order is lower than a highest modulation order set by the system;
for each physical resource carrying the non-known data, the modulation order of the non-known data carried on the physical resource is equal to or lower than a modulation order of user data carried on the nearby physical resources of the physical resource and sent to a same receiving end,
wherein, the physical resources use a resource element as a unit; each physical resource carrying the non-known data refers to each resource element carrying the non-known data, and the physical resources near the each physical resource refer to other resource elements in a physical resource block where the resource element is located.

10. The method according to claim 7, wherein
the transmission method further comprises: transmitting data on physical resources of the channel or signal according to the selected transmission mode, wherein the physical resources of the channel or signal are distributed on physical time-frequency resources of the system in a distributed manner or in an interval-distribution manner, and a distribution manner of the physical resources of the channel or signal may be the same as or different from that of physical resources of a reference signal.

11. The method according to claim 7, wherein
the non-known data refers to control information data and/or user data,
and,
the control information data comprises at least data about interference data related information.

12. A sending end, comprising a transmission mode selection module and a transmission module, for control information, wherein
the transmission mode selection module is configured to select one transmission mode from a plurality of transmission modes configured for control information, wherein one of the plurality of transmission modes is to transmit on partial physical resources of a reference signal; and
the transmission module is configured to send transmission mode configuration information for the control information to a receiving end to indicate the selected transmission mode.

13. The sending end according to claim 12, wherein
the transmission module sending the transmission mode configuration information for the control information to the receiving end comprises: sending the transmission mode configuration information for the control information to the receiving end through a common channel,
the transmission module comprises a data processing unit and a data sending unit, and activates the data processing unit and the data sending unit to transmit control information data when the selected transmission mode is to transmit on the partial physical resources of the reference signal.

14. The sending end according to claim 13, wherein
the data processing unit is configured to perform low bit rate coding and/or low order modulation on data containing control information, wherein the low bit rate coding satisfies a limitation that: a coding rate is lower than a highest coding rate set by a system, and the low order modulation satisfies a limitation that: a modulation order is lower than a highest modulation order set by the system; and
the data sending unit is configured to carry the data containing the control information, on which the low bit rate coding and/or the low order modulation have/has been performed, on partial physical resources of a reference signal to send to a receiving end.

15. The sending end according to claim 14, wherein
when the data processing unit performs the low bit rate coding on the data containing the control information, a limitation is further satisfied that: the coding rate is equal to or lower than a coding rate of user data carried on nearby physical resources and sent to a same receiving end, wherein the nearby physical resources comprise physical resources near each physical resource of the partial physical resources;
when the data processing unit performs the low order modulation on the data containing the control information, a limitation is further satisfied that: for each physical resource of the partial physical resources, a modulation order of the data containing the control information carried on the physical resource is equal to or lower than a modulation order of the user data carried on nearby physical resources of the physical resource and sent to a same receiving end;
wherein the physical resources use a resource element as a unit; each physical resource of the partial physical resources refers to each resource element in the partial physical resources, and the physical resources near the each physical resource refer to other resource elements in a physical resource block where the resource element is located.

16. The sending end according to claim 14, wherein
the data sending unit carries the data containing the control information, on which the low bit rate coding and/or the low order modulation have/has been performed, on the partial physical resources of the reference signal to send to the receiving end, wherein the partial physical resources of the reference signal are distributed on physical resources of the reference signal in a distributed manner or in an interval-distribution manner.

17. The sending end according to claim 14, wherein
the data processing unit performing the low code rate coding on the data containing the control information comprises: performing the low bit rate coding on control information data, and
the data processing unit performing the low order modulation on the data containing the control information comprises: performing the low-order modulation on the control information data, or performing the low-order modulation on data obtained after combining the control information data and reference signal data.

18. A sending end, comprising a transmission mode selection module and a transmission module, for a channel or signal, wherein:

the transmission mode selection module is configured to select one transmission mode from a plurality of transmission modes configured for a channel or signal, wherein the plurality of transmission modes comprise two or three of the following transmission modes: transmitting known data; transmitting non-known data and being subject to a coding limitation and/or a modulation limitation; and transmitting non-known data and not being subject to the coding limitation and the modulation limitation; and the transmission module is configured to send transmission mode configuration information for the channel or signal to a receiving end to indicate the selected transmission mode.

19. The sending end according to claim 18, wherein
the transmission module sending the transmission mode configuration information for the channel or signal to the receiving end comprises: sending the transmission mode configuration information for the channel or signal to the receiving end through a common channel.

20. The sending end according to claim 18, wherein
the modulation limitation on the plurality of transmission modes selectable by the transmission mode selection module comprises one or more of the following limitations that:

a modulation order is lower than a highest modulation order set by a system;

for each physical resource carrying the non-known data, the modulation order of the non-known data carried on the physical resource is equal to or lower than a modulation order of user data carried on the nearby physical resources of the physical resource and sent to a same receiving end;

the coding limitation on the plurality of transmission modes selectable by the transmission mode selection module comprises one or more of the following limitations that:

a coding rate is lower than a highest coding rate set by the system;

the coding rate is equal to or lower than a coding rate of user data carried on nearby physical resources and sent to a same receiving end, wherein the nearby physical resources comprises physical resources near each physical resource carrying the non-known data;

wherein the physical resources use a resource element as a unit; each physical resource carrying the non-known data refers to each resource element carrying the non-known data, and the physical resources near the each physical resource refer to other resource elements in a physical resource block where the resource element is located, and, the non-known data in the plurality of transmission modes selectable by the transmission mode selection module refers to control information data and/or user data.

21. The sending end according to claim 18, wherein
the transmission module is further configured to transmit data on physical resources of the channel or signal according to the selected transmission mode, wherein the physical resources of the channel or signal are distributed on physical time-frequency resources of the system in a distributed manner or in an interval-distribution manner, and a distribution manner of the physical resources of the channel or signal may be the same as or different from that of physical resources of a reference signal.

22. A non-transitory computer readable storage medium, in which a computer program is stored, wherein the computer program comprises program instructions, which, when executed by a device at a sending end, enable the device to execute the method according to claim 1.

23. A non-transitory computer readable storage medium, in which a computer program is stored, wherein the computer program comprises program instructions, which, when executed by a device at a sending end, enable the device to execute the method according to claim 7.

* * * * *